US009185441B2

(12) United States Patent
Pequignot (10) Patent No.: US 9,185,441 B2
(45) Date of Patent: Nov. 10, 2015

(54) UPSTREAM/DOWNSTREAM NETWORK AND/OR CONTENT DELIVERY APPARATUS AND METHODS

(71) Applicant: Matthew A. Pequignot, Encinitas, CA (US)

(72) Inventor: Matthew A. Pequignot, Encinitas, CA (US)

(*) Notice: Subject to any disclaimer, the term of this patent is extended or adjusted under 35 U.S.C. 154(b) by 0 days.

(21) Appl. No.: 14/216,904

(22) Filed: Mar. 17, 2014

(65) Prior Publication Data

US 2014/0282638 A1    Sep. 18, 2014

Related U.S. Application Data

(60) Provisional application No. 61/791,351, filed on Mar. 15, 2013.

(51) Int. Cl.
| | |
|---|---|
| *H04N 21/237* | (2011.01) |
| *H04N 21/4725* | (2011.01) |
| *H04N 21/431* | (2011.01) |
| *H04N 21/478* | (2011.01) |
| *H04N 21/488* | (2011.01) |
| *H04N 21/81* | (2011.01) |

(52) U.S. Cl.
CPC ......... *H04N 21/237* (2013.01); *H04N 21/4312* (2013.01); *H04N 21/4725* (2013.01); *H04N 21/47815* (2013.01); *H04N 21/4882* (2013.01); *H04N 21/812* (2013.01); *H04N 21/8146* (2013.01)

(58) Field of Classification Search
CPC .......... H04N 21/4722; H04N 21/4725; H04N 21/47815; H04N 21/8583; H04N 21/858

USPC ............................................... 725/40, 42, 112
See application file for complete search history.

(56) References Cited

U.S. PATENT DOCUMENTS

| | | | |
|---|---|---|---|
| 8,356,329 B2* | 1/2013 | Katcher et al. ................ 725/113 |
| 2002/0056136 A1* | 5/2002 | Wistendahl et al. .......... 725/135 |
| 2002/0162118 A1* | 10/2002 | Levy et al. .................... 725/110 |
| 2004/0109087 A1* | 6/2004 | Robinson et al. ............. 348/461 |
| 2008/0071594 A1* | 3/2008 | Morin .............................. 705/7 |
| 2008/0098450 A1* | 4/2008 | Wu et al. ....................... 725/132 |
| 2014/0282638 A1* | 9/2014 | Pequignot ......................... 725/5 |

* cited by examiner

*Primary Examiner* — James R Sheleheda
(74) *Attorney, Agent, or Firm* — Matthew A. Pequignot; Pequignot + Myers LLC (57) ABSTRACT

Apparatus and methods in the field of bi-directional (or interactive) networks. In some embodiments, bi-directional networks which provide, include, and/or enable point-of-purchase options (e.g., to or within displays or plays of media such as movies, television, and/or video). In some embodiments, bi-directional networks which permit or allow product placements to be directly monetized. In some embodiments, bi-directional or interactive networks which provide and/or include selectively visible advertising. In some embodiments, bi-directional or interactive networks which provide or include selectively visible advertising or point of purchase opportunities which are uniquely associated, affiliated, or connected to a consumer interest. In still other embodiments, methods and/or apparatus for increasing advertising and/or product placement effectiveness and/or for apportioning profits related to commercialization of advertised goods and/or services.

17 Claims, 8 Drawing Sheets

UPSTREAM/DOWNSTREAM NETWORK AND/OR CONTENT DELIVERY APPARATUS AND METHODS

RELATED APPLICATION DATA

This application claims priority to U.S. Patent Application No. 61/791,351, similarly titled, and filed Mar. 15, 2013. The entirety of such application is hereby incorporated by reference.

FIELD OF INVENTION

This invention relates to apparatus and methods in the field of bi-directional (or interactive) networks. In some embodiments, this invention relates to bi-directional networks which provide, include, and/or enable point-of-purchase options (e.g., to or within displays or plays of media such as movies, television, and/or video). In some embodiments, this invention relates to bi-directional networks which permit or allow product placements to be directly monetized. In some embodiments, this invention relates to bi-directional or interactive networks which provide and/or include selectively visible advertising. In some embodiments, this invention relates to bi-directional or interactive networks which provide or include selectively visible advertising or point of purchase opportunities which are uniquely associated, affiliated, or connected to a consumer interest. In still other embodiments, this invention relates to methods and/or apparatus for increasing advertising and/or product placement effectiveness and/or for apportioning profits related to commercialization of advertised goods and/or services.

BACKGROUND OF THE INVENTION

"Product placement" is a known but non-traditional advertising technique in which products (or in some cases services) are intentionally displayed in movies or television shows. In a conventional product placement advertisement, there is an agreement between the manufacturer of a product and a media company, such as a movie or television production company, where the product manufacturer pays to have one or more products prominently displayed in a movie or television show. In such an arrangement, the product manufacturer is willing to pay product placement fees, particularly in the case of a movie featuring famous actors or a television show which is popular among viewers, in the hopes that viewers will be more likely to buy a "placed" product if it is seen associated or identified with a famous actor, a well-known character (e.g., James Bond), or a popular television show personality. Although often large fees are charged to place products within movies or television shows, it is impossible to measure the true effectiveness of such product placement advertising. Moreover, heretofore there have been no immediate opportunities for a viewer to purchase a product, even if it is perceived as desirable by the viewer, after the product is seen as a result of the product placement.

Similar to "product placement" advertising, although television commercials have been used for decades between television shows and during interruptions of television shows, there has been no way to measure their effectiveness or to directly, immediately monetize a television commercial. Furthermore, with the advent of new technologies, television viewers are now able to skip or pass over television commercials entirely, such as when watching a television program which has been pre-recorded at a viewer's home on a digital video recorder or "DVR" (thus, effectively making commercials useless in some cases).

It is, in certain embodiments, a purpose of the herein described inventions to address one or more of the above drawbacks of product placements and television commercials. It is also a purpose of the herein described inventions to address other drawbacks and/or other desires for improvements in the art, whether or not currently known, which will become more apparent to the skilled artisan once given the present disclosure.

SUMMARY OF CERTAIN EXAMPLES EMBODIMENTS OF THE INVENTION

Generally speaking, one or more of the inventions described herein provide apparatus or methods for enabling or completing consumer transactions, or for providing product information on demand. For example, certain of the embodiments described herein enable product placements to be monetized and/or enable the effectiveness of product placements to be measured. In at least one example of such embodiments, a unique bi-directional network is provided or employed, in combination with and/or delivering product placements, which enables or aids in such monetization or measurement. In other example embodiments, unique components of such a bi-directional network, such as a uniquely configured set-top box, are provided or employed which are used in conjunction with product placements for monetization and/or measuring. In other example embodiments, the herein described inventions are utilized in combination with television commercials.

In at least some embodiments, apparatus and/or methods are provided in which advertising or product purchase opportunities are provided to prospective customers on a demand or requested basis. In other words, advertising or product purchase opportunities are essentially invisible (and, in some embodiments, completely invisible) to a viewer until the viewer makes a specific request or demand to view the advertising content or be presented with a purchase opportunity. In this way, television or movie or video content can be delivered to a consumer (or potential consumer) in a way which is entirely non-disruptive to a media viewing experience. This is in contrast to conventional television advertising, for example, where a television program is interrupted mid-story to display a television commercial which might not even be relevant to a consumers or viewer's interests.

In at least one embodiment, there is provided: a method or process comprising: broadcasting or delivering movie or video or television content over broadband network to viewing subscribers with no overt or visible advertising being displayed in the movie or television content; broadcasting, delivering, or making available advertising or product placement or point of purchase opportunities to viewers upon the request or action of the viewers.

In at least one other embodiment, there is provided: a method comprising: storing in an address database consumer viewer delivery address information; storing in a payment database consumer viewer payment account information; transmitting data comprising a program feed from a program feed source in a bi-directional data network to a display screen displaying the program feed to a consumer viewer, the program feed including movie or television program content; transmitting data comprising covert or invisible advertising data, not initially visibly displayed on the display screen to the consumer viewer, from a source in the bi-directional network to the display screen displaying the movie or television program content feed or to a hardware device communicably connected to the display screen; the consumer viewer, viewing the display screen, activating a query comprising a data request upon viewing a desired product displayed in the movie or television program content feed; processing the data request, including by querying a database connected to the bi-directional data network, for available data, to determine whether product information is available for particular products displayed on the display screen at the particular time during which the data request is initiated by the consumer viewer activated query; displaying available product information for the particular products displayed on the display screen at the particular time during which the data request is initiated by the consumer viewer activated query; providing a point of purchase opportunity for the consumer viewer to purchase the products for which available product information is displayed on the display screen; and accessing the address and payment databases upon consumer viewer acceptance of the point of purchase opportunity to purchase one or more products, and debiting or charging the stored consumer viewer payment account for a price or prices of the one or more products purchased and initiating delivery of the one or more products purchased to the stored consumer viewer delivery address.

In yet an additional embodiment, there is provided: a method of delivering advertising or point of purchase opportunities which are initially covert or invisible but which are capable of conversion by viewers, upon specific action or request made by viewers, to be overt or visible, comprising: storing in an address database consumer viewer delivery address information; storing in a payment database consumer viewer payment account information; transmitting data comprising a program feed from a program feed source in a bi-directional data network to a display screen displaying the program feed to a consumer viewer, the program feed including movie or television program content; the consumer viewer, viewing the display screen, activating a query comprising a data request upon viewing a desired product displayed in the movie or television program content feed; processing the data request, including by querying a database connected to the bi-directional data network, for available data, to determine whether product information is available for particular products displayed on the display screen at the particular time during which the data request is initiated by the consumer viewer, a presence of available data in the database initiating a conversion of a covert, non-program-interruptive product placement advertisement, not initially interruptively displayed on the display screen, to a visible advertisement comprising a display of available product information for the particular products displayed on the display screen at the particular time during which the data request is initiated by the consumer viewer activated query; providing a point of purchase opportunity for the consumer viewer to purchase the products for which available product advertising information is displayed on the display screen; and accessing the address and payment databases upon consumer viewer acceptance of the point of purchase opportunity to purchase one or more products, and debiting or charging the stored consumer viewer payment account for a price or prices of the one or more products purchased and initiating delivery of the one or more products purchased to the stored consumer viewer delivery address.

In at least one embodiment, methods or networks are provided where overt advertisements are displayed or broadcast with movie or video or television content, but where unique opportunities and methods are provided to purchase or monetize such overt advertisements.

In still other embodiments, users or viewers may join networks of cable network viewers (e.g., such as with friends or family).

In still additional embodiments, users or viewer consumers can tag products displayed in program feeds or as displayed in photographs displayed in social networking sites or photo or video sharing sites. In such embodiments, users or viewer consumers can optionally be rewarded if other users take action with respect to the user or viewer created tag.

Certain examples of the invention are now described below with respect to certain non-limiting embodiments thereof as illustrated in the following drawings wherein:

BRIEF DESCRIPTION OF CERTAIN EXAMPLE DRAWINGS

The drawings submitted with and which form a part of this patent application each illustrate an embodiment, or one or more components of an embodiment, of a non-limiting example of Applicant's invention. While these drawings depict certain preferred embodiments of Applicants' invention, as well as certain particularly desirable features thereof, they are intended to be examples only and should not be construed to limit the scope of Applicant's invention.

DETAILED DESCRIPTION OF CERTAIN EXAMPLE EMBODIMENTS OF THE INVENTION

For a more complete understanding of the present invention, reference is now made to the following description of various illustrative and non-limiting embodiments thereof, taken in conjunction with the accompanying drawings in which like reference numbers indicate like features.

Figure 1A:
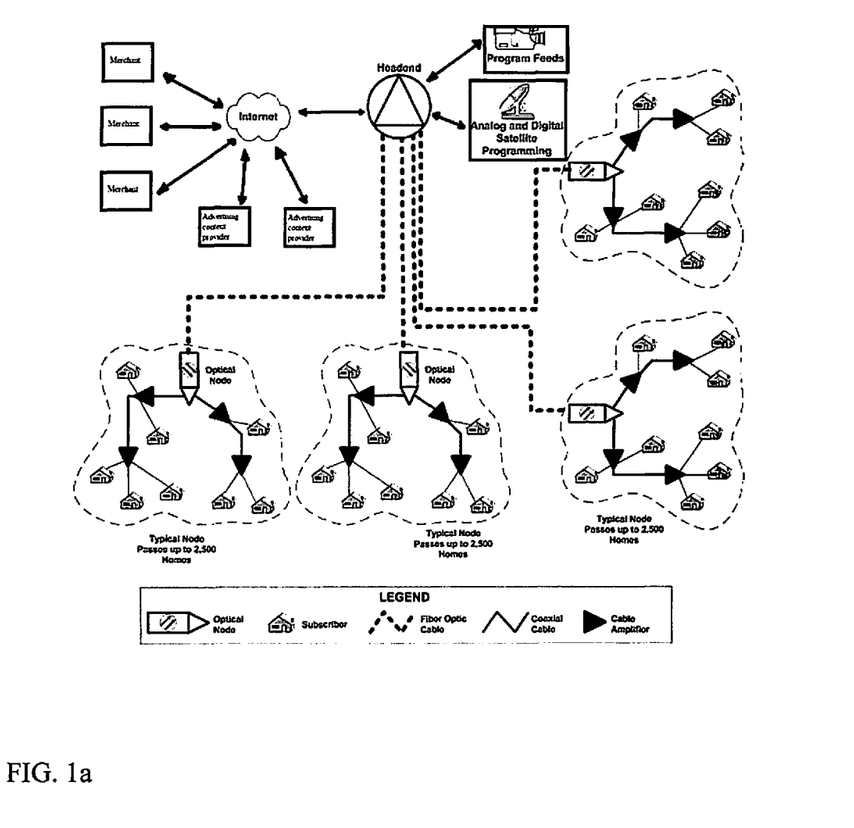
FIG. 1a illustrates one embodiment of a cable network, useful with one or more example embodiments of the present inventions.
Figure 1B:
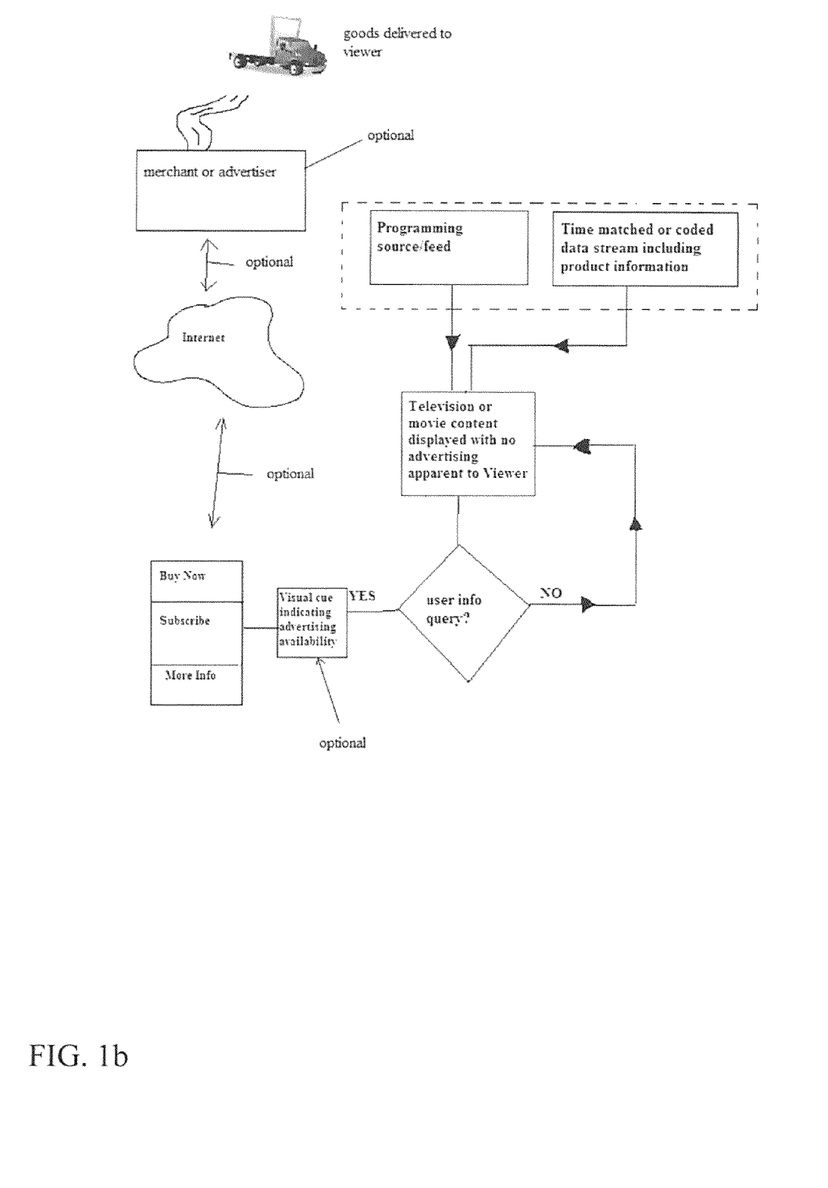
FIG. 1b illustrates one embodiment of a bi-directional network in which dual data streams are delivered to a viewer, wherein a viewer is capable of accessing a covert or invisible data stream using a query function.
Figure 1C:
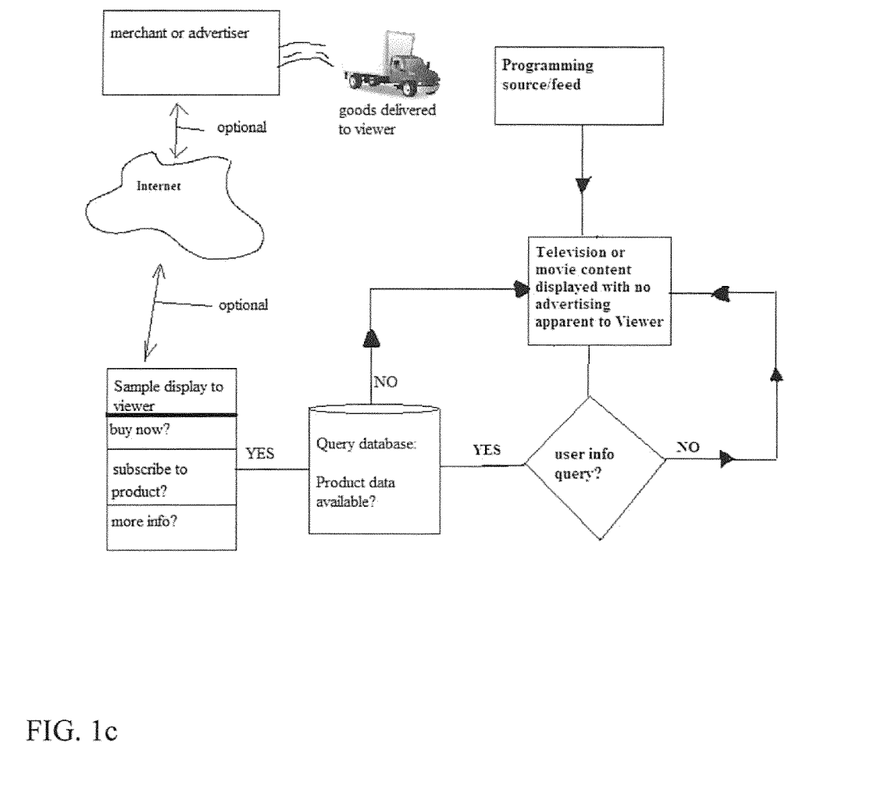
FIG. 1c illustrates another embodiment of a bi-directional network in which a viewer is capable of accessing a product or service related data stream using a query function to query a database for product or service related information or opportunities.
Figure 2:
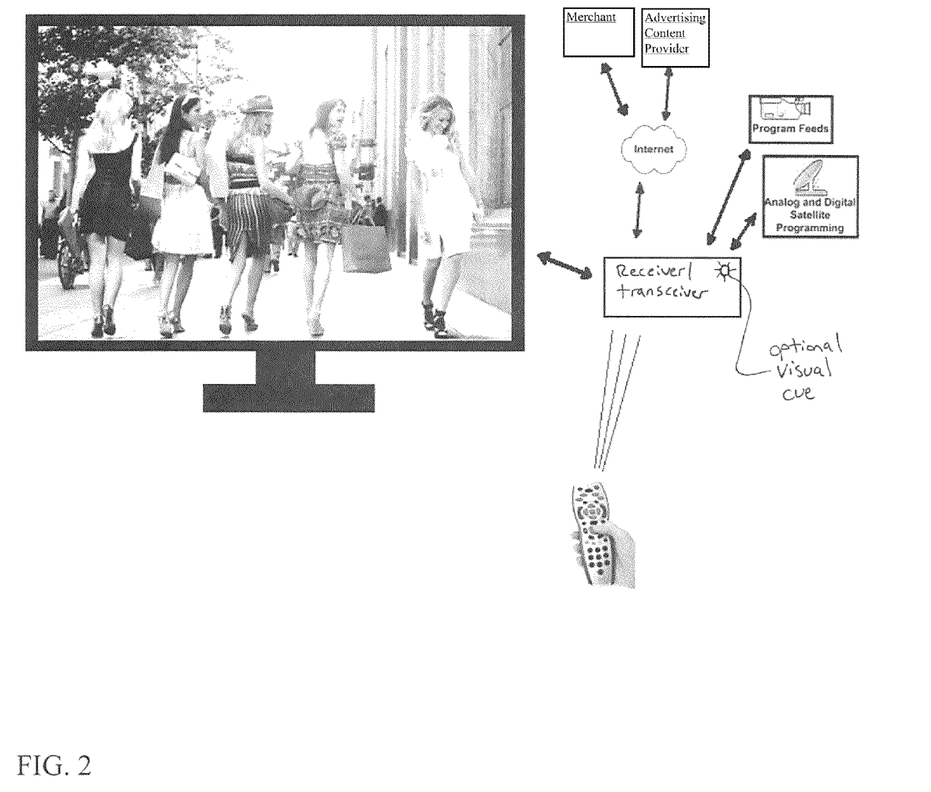
FIG. 2 illustrates an example screen shot of a cable television program, being delivered by a content or program entity over a network, being viewed by a viewer with product placements displayed, but with no overt or visible advertising or product information contained within the display.
Figure 3:
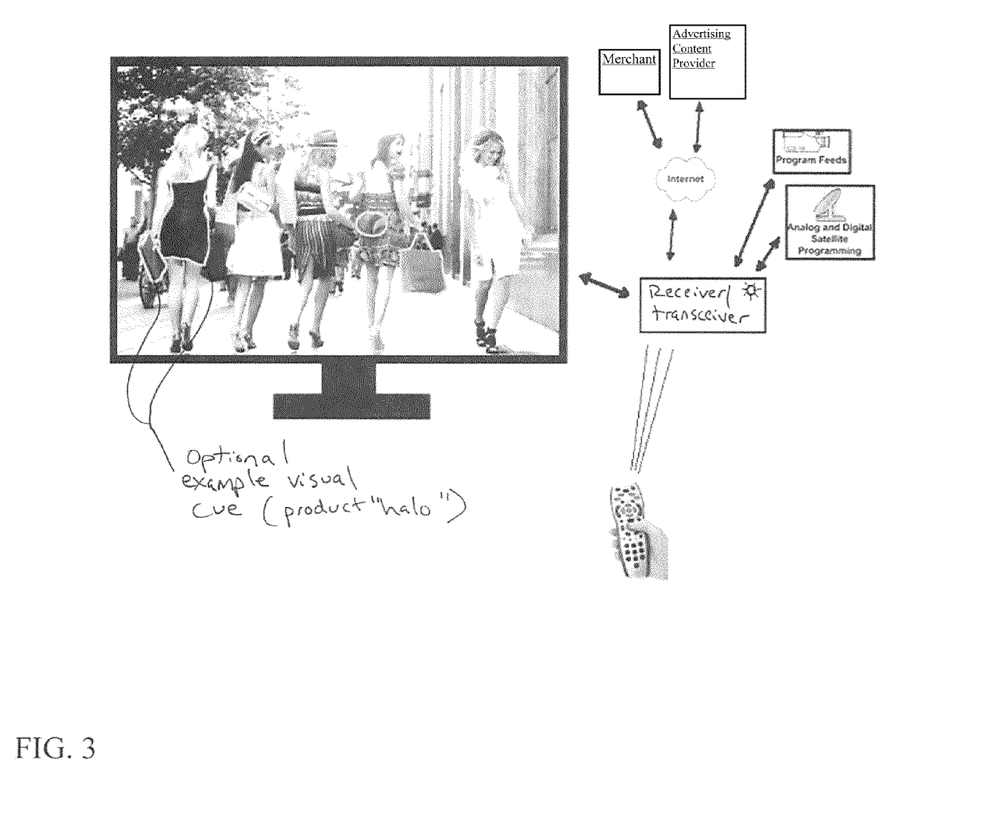
FIG. 3 illustrates the example screen shot depicted in FIG. 2 with visual cues to the screen shot inserted by a supplemental data stream subsequent to a query function being initiated by a viewer interested in a product appearing in the screen image.
Figure 4:
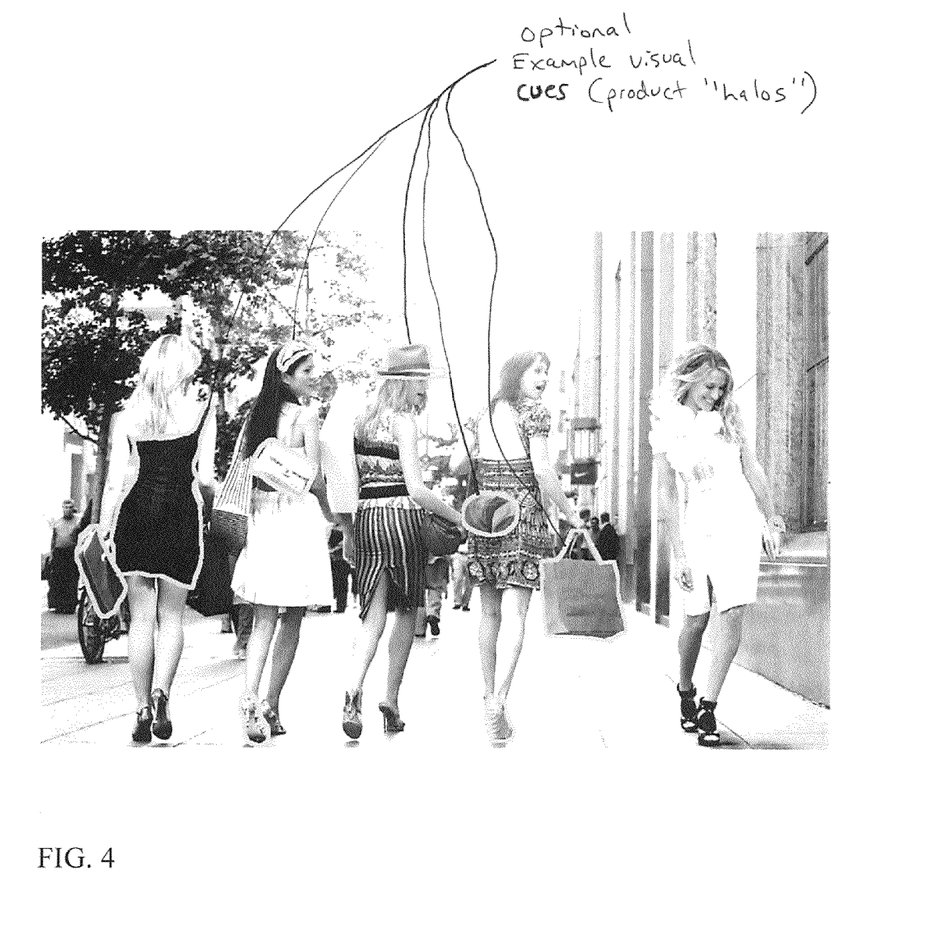
FIG. 4 is a more detailed, close-up view of the screen shot depicted in FIG. 3.

Addressing one or more of the above-described drawbacks or needs in the prior art (or other drawbacks or needs not specifically described herein), at least one embodiment of the subject invention is embodied in, capable of being operated or implemented within, or is otherwise deployable in, the example network or environment illustrated in FIG. 1a. In this example network, a cable television headend is shown illustrated as a central or master facility for receiving movie, television, and other program feed signals for processing and distribution over the illustrated cable television system. The cable television headend will normally have a multitude of receive-only satellite television dishes for reception of movie and television network signals from cable or satellite content networks. Satellite dishes may be provided at the headend for this purpose, to accept program content for distribution across the network which may be a coaxial cable, copper wire telephone-type, or fiber optic network, for example. Though other network types may of course be employed, the overall purpose is to deploy a multitude of programming content to end viewers or customers, which may take place by delivering and distributing programming signals via local optical nodes which, in turn, further distribute the signals to individual homes utilizing set-top boxes (or other processing hardware), for example. Internet connectivity may be provided by using the same network or by a separate network employing a different data exchange routes or delivery types. For example, cable movie or television programming may be delivered by the network illustrated in FIG. 1a whereas internet connectivity may be provided by a separate "in-ground" network, or direct to viewer/consumer homes such as by personal satellite provided in viewer user houses (the reverse scenario is also possible).

Examples of embodiments in which a network, such as the network depicted in FIG. 1a, are implemented or utilized according to the various inventions described herein are illustrated in FIGS. 1b-1c and FIGS. 2-6. In some of these example embodiments, a network is provided in which media content (such as a movie or television program) is being delivered to a viewer's home which looks entirely "normal" to the viewer in that it is unencumbered by any undesirable visible advertising or media viewing breaks. In certain example embodiments, the content is delivered via a cable or satellite network which is optionally, in certain example embodiments, delivering content to a viewer's television screen (or computer display or projection system) via a set-top box, for example. In such an example embodiment, if a viewer is watching a cable delivered movie program, such as Sex in the City (the movie or cable television show), the viewer may see objects or products displayed within the cable program which are desirable to the viewer (see FIGS. 2-4). These may be a result of pre-arranged product placements displayed within the program. Alternatively, in other embodiments described further below, these products may just appear in the program via happenstance (e.g., because they were chosen by a costume professional or a set design professional unconcerned with product placement).

In an example embodiment in which the desirable product is noticed by a viewer as a result of an intentional product placement, if the viewer chooses, the viewer can opt to receive advertising (or promotional) content pertaining to the desirable product and/or opt to be presented with an opportunity to purchase the product. More specifically, if a viewer notices a particular desirable product or object, the viewer can make an affirmative choice to render previously invisible advertising or point of purchase opportunities visible. For example, if a viewer sees a pair of sunglasses worn by an actress in the Sex in the City cable program, the viewer may decide that he or she wants further information about the sunglasses and/or wants to purchase the sunglasses. Having made such a decision, even though there is no visible or detectable advertising, etc. displayed on or within the program to disrupt the normal viewing experience, the viewer can take an affirmative step to cause advertising or promotional information or point of purchase opportunities to be presented or displayed. These may be displayed visually or audibly (or both) immediately (upon specific action taken by the viewer) and/or may be "saved" for future playback or viewing at a later time (and/or they may be delivered by email or text message or conventional mail, for example). In one example of such an embodiment, when a viewer watching the example Sex and the City program is receiving the program content via a set-top box, when the viewer sees the example desirable sunglasses in the Sex in the City program, the viewer can press a provided "query" or "info" button contained on a remote control (or located on a mobile device such as a mobile phone or handset, for example), such as the remote control illustrated in FIG. 6.

Figure 6:
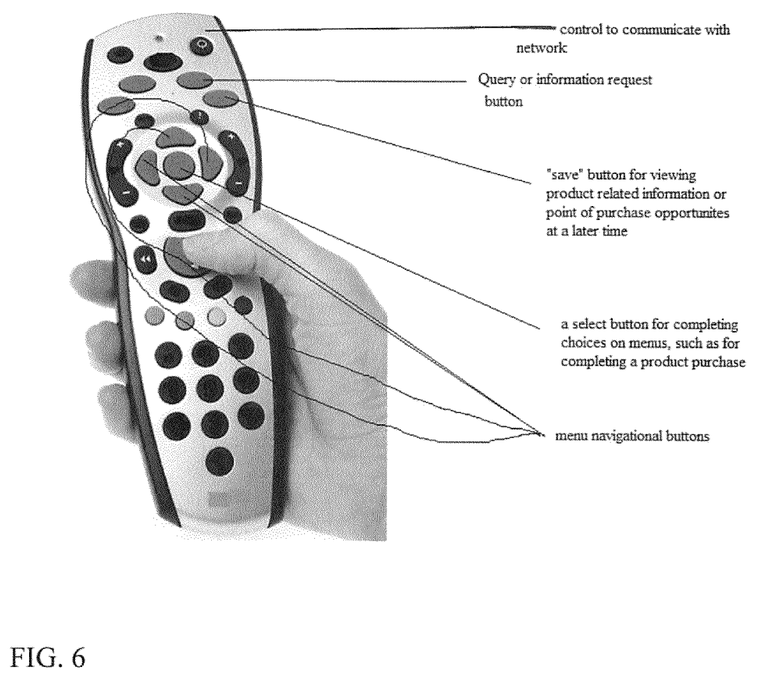
FIG. 6 is an example remote control useful with the networks described herein which may be used by a viewer to initiate a query function on a network and which may be used to select a product and complete a purchase, for example.

Although no advertising content, etc. was visible prior to pressing the "query" or "info" button, upon pressing the button, advertising and/or related content (such as a purchase opportunity) is caused to appear. This may be by interruption of the program being viewed (in which case the program is "paused" such that normal viewing can be resumed after viewing the advertising or making a purchase, for example) or by simply displaying the requested content in a portion of the viewing screen. Alternatively, the advertising content or purchase opportunity may be delivered to a different medium (e.g., via email or text) or may be saved for later viewing or use.

Figure 5:
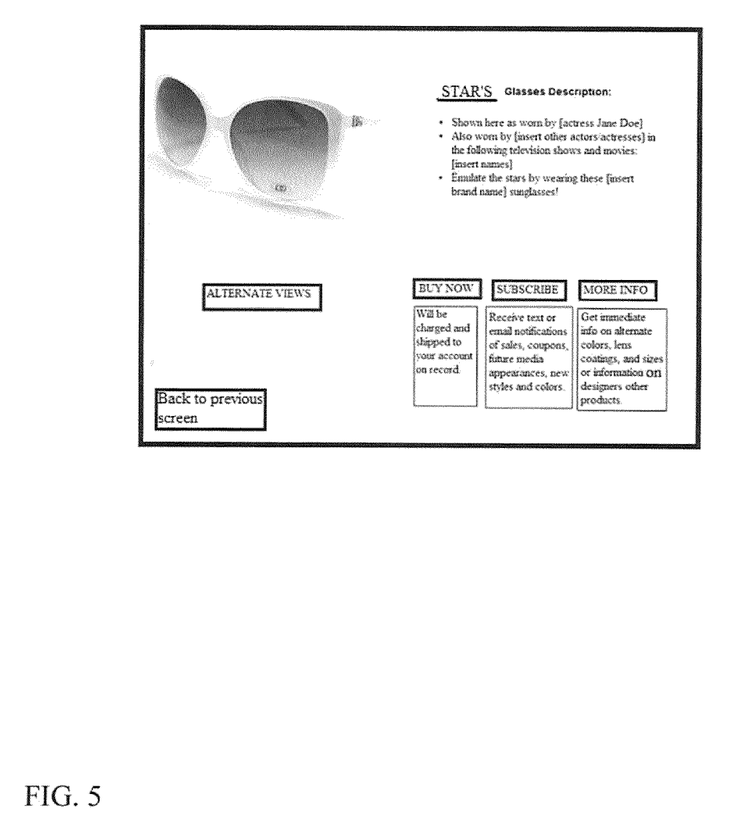
FIG. 5 is an example product information and opportunity screen which may be accessed and displayed to a viewer subsequent to a viewer initiating a query function upon seeing a product of interest in a cable television program. This example information and opportunity screen permits a viewer receive further information about the sunglass product, purchase the product using the network, and/or subscribe to the product so as to receive future coupons or sale information, for example.

Content which is provided to a viewer upon pressing the "query" or "info" button, in this example, is not limited to any particular content but may optionally include brand information, sunglass model information or sizes, price, retail store availability, the name of the television or movie actor/actress wearing the sunglasses, the names of other television or movie actors or actresses which have worn or wear the sunglasses, future sale information, information regarding other products within the same brand, and competing brand products. This information may be provided upon specific selection of "information" menu "buttons" or opportunities provided on the television (or other display type) screen. As another option, a "buy" or "purchase" opportunity may be presented in a menu on the display screen (e.g., in the form of a "buy" or "purchase" button). FIG. 5 illustrates an example screen shot depicting the types of information about a selected product that may be displayed. Of course, other information types or other formats for displaying the information may be provided.

In preferred embodiments, the viewer is given an option to immediately purchase the goods which prompted the viewer to press the "query" or "info" button in the first instance. In one such example, after the "info" or "query" button is selected, the viewer is provided with price information to purchase the product. If the viewer desires to purchase the product upon viewing the price, the viewer can simply activate a "buy now" or "purchase" button, or similar button or selection mechanism (whether provided in physical form on a remote control or in "soft" form on the media display screen), upon which the sale or purchase may be completed. In preferred embodiments, where the media programming is being provided by a cable or television or satellite provider, for example, the viewer's credit card information may be stored in association with the viewer's account with such subscribed provider. Alternatively, the purchase price may simply be added onto a subscriber's cable or satellite television bill, for example.

In still other embodiments, a third party device (or network) may be communicably linked into the media display network such that the third party device (or network) completes the product purchase and charges the viewer for the product. In preferred variations of these example embodiments, the viewer's desired shipping address is stored in the network or in the set-top box, for example, so that when the purchase is completed, the goods are automatically shipped to the preselected or pre-input shipping address. By allowing a viewer to pre-store his or her address, a shipping address need not be entered each time a product is purchased. In some example embodiments, however, a viewer will have the option of selecting or inputting different or alternative shipping addresses. This can be for the purposes of sending a gift to someone remote from the viewer/purchaser, for example.

In a further example employing a specific network type, a bi-directional cable plant or network is provided or employed which is capable of both downstream and upstream data traffic. In this particular example, a broadband coaxial cable network is provided or used to enable a wide frequency bandwidth. The wide frequency bandwidth permits, in particular, a plurality of data streams to be simultaneously delivered downstream from a head end facility to a plurality of viewer homes (e.g., via cable boxes or set-top boxes located in viewer homes or businesses). The plurality of data streams may be, for example, a multitude of different cable or television channels, each including its own audio-visual (or one or the other) content (e.g., a movie, a cable or conventional television program, or music), for delivery for viewing in each of the viewers' homes and/or businesses (the individual viewer choosing whether to watch and/or which data stream or channel to view). In addition to being able to receive data streams such a movie programs, viewers (or at least one viewer) in this example have transceiver(s) and/or modem(s) and/or set-top box(es)—installed or located in their homes (or businesses)—which enable delivery or transmission of data (e.g., digital signals) upstream to the head end of the network (e.g., the core of the cable plant). In other words, in the provided network, viewers are able to not only receive data transmissions from the network (e.g., in the form of movie programming), but they are able to send data via the network as well (e.g., back to the head-end or elsewhere).

Although this example contemplates that the same data network is used for transmitting and receiving upstream and downstream data transmissions (via use of separate frequency bands called upstream and downstream spectral bands), it is, of course, contemplated that alternative delivery/receipt pathways may be employed. For example, sending and receiving of data does not need to be on the same transmission lines, but may be delivered/received on a mix of coaxial cable, fiber-optic transmission lines, high frequency radio signals (e.g., WIFI), satellite transmissions, and/or cellular networks. In other examples, a single cable plant or network may be a mix of different transmission line-types and may include, for example, a mix of coaxial cable components communicably connected to a dense-wavelength-division-multiplexing ("DWDM") passive optical network comprised of optical fiber. In this particular example, however, movie content is being delivered to a viewer home via downstream spectral bands so that it is viewable on the viewer's television after passing through a set-top or cable box. The movie content being delivered and being viewed by the viewer does not contain any visible advertisements and is uninterrupted by commercial breaks, for example.

However, in addition to the movie content being delivered, in some (but not all) embodiments, at least a second data stream is being delivered (continuously or discontinuously, on viewer request/demand or automatically) which is essentially invisible to the viewer. That is, the data stream does not visually disrupt the viewing experience of the movie in any appreciable manner, if at all. It is nevertheless contemplated, though, that the second data stream may be used or processed so that small or unobtrusive visual cues are given, which are related to the content of the second data stream. For example, the delivery of the second data stream may be processed or used to result in a light appearing on the set-top box or viewer's remote control or in a small area of a television screen (or other display screen). In either event, the second data stream is effectively invisible in the sense that it does not interfere with the viewer's enjoyment of the movie program being delivered.

When a desirable product appears in the movie, such as in the example described with respect to sunglasses above, however, the viewer may activate or initiate a data access (or delivery) request. This may be by pushing a "query" or "info" button as described in the other example above. Upon activating or initiating the data request (upon which a signal or data is sent from the remote control to the cable box, and/or the cable plant, for example), the movie may be interrupted so that the viewer is informed as to whether there is further information or advertising available pertaining to the desirable product or as to whether the product may be purchased, for example. In another example, coupons may be indicated as available and/or the viewer may be invited to be "subscribed" to the product so that the view receives future information regarding sales, price drops, future product offerings, etc. (e.g., via the cable network, via SMS or MMS text, via email, or even via regular mail).

Availability of the above types of information or opportunities may be indicated in numerous ways including by the display of a halo or highlighting on or around a product visible in the movie (the data pertaining to the halo or highlighting being delivered from the second data stream, for example). Text on the screen may also be optionally displayed. If such a halo or other indicator is provided to the viewer, the viewer may then initiate a second step which interrupts the movie entirely to display a range of options or information related to the product selected. Of course, if more than one product is highlighted or surrounded by a halo, the viewer may select a specific product using buttons on the remote control or via similar mechanism. In alternative embodiments, the step in which a visual cue such as a halo or highlighting is displayed may be skipped or not employed entirely, with the initial "query" or "info" button press of the viewer triggering the display of a new screen in which a full range of product information and/or purchase opportunities are displayed. For example, even though the viewer is only interested in sunglasses in this example, if a purse is also in the movie scene at the time the respective button is pushed, the screen which is subsequently displayed may give information about the sunglasses and the purse (or an infinite number of other products or services, for example). Multiple point of purchase opportunities or subscription opportunities may also be simultaneously provided. In this example, however, if the viewer decides to purchase the goods displayed or to obtain further information or to subscribe to the product, data related to the purchase (or other viewer action) is sent upstream, via upstream spectral bands on the network, to the head-end where it may be delivered elsewhere—such as to a merchant—or be processed by the head end, for example. In other example embodiments, the data may be sent directly to a merchant or advertiser, while by-passing the head-end, either using the upstream portions of the network or by transmission on separate or parallel networks such as wireless or satellite networks. In this embodiment, invisible data (or visible-on-demand data) pertaining to products (such as purses, sunglasses, shoes, pizza, etc.) may be delivered to the viewer in numerous ways.

For example, the second data stream containing the product data may be delivered continuously with the movie data stream. Or, the transmission of the second data stream may optionally only begin once a request for such data is initiated by the viewer (such as by "query" button push). In the latter instance, for example, if a viewer pushes the "query" button while the desirable sunglasses are being displayed, an upstream signal is transmitted via the network to a database which is cross-checked to see if data is available regarding the sunglasses being displayed (e.g., by use of code contained in the movie data stream matched to a code in the database or by comparing a time sequence or code pertaining or corresponding to the time of the appearance of the sunglasses in the movie stream). If such data is available, it will then be transmitted downstream for use by the viewer or display to the viewer (i.e., only to this viewer in this example, and not to all the other viewers linked to the cable network). In the former instance, a time sequenced or time coordinated or matched data stream is continually broadcast with the movie content (or movie data stream) and simply remains invisible until a viewer requests that it be accessed and/or become visible. In still other embodiments, the data related to the product or products need not be resident in a separate data stream but may be encoded or transmitted with the movie data stream itself, while otherwise remaining invisible until a request for visibility is made by the viewer.

In some embodiments of this invention, movie or television production organizations/companies—or in other embodiments, advertisers—are paid for, create, contract for, and/or insert the covert or invisible product placement information or data or purchase opportunities into the cable or network data stream. In some alternative (or the same or similar) embodiments, the expense of creating and/or delivering the covert or invisible product advertising is carried by a network provider or a movie or television company—in whole or in part—but is passed to a product manufacturer or advertiser (in whole or in part) if a viewer or viewers initiate queries to view the previously convert or invisible advertising. In other embodiments, if a viewer or viewers initiate or complete a purchase of goods via the network (i.e., as a result of the delivery of the covert or invisible advertisement or point of purchase opportunities over the network), profits for the sale of the goods are apportioned or shared between the network provider, the movie or television (or other media) producer, the advertiser, and/or the merchant. In still other or similar embodiments, the product merchant or manufacturer does not pay for the placement or production of the covert or invisible product related data streams unless such data streams are accessed or "converted" by viewers to visible advertising or point of purchase opportunities. In yet further embodiments, the product merchant or manufacturer does not pay for the placement or production of the covert or invisible product related data streams unless a product is actually purchased as a result of a use of a point of purchase opportunity provided on the network.

In still other embodiments, a consumer viewer may provide product information or point-of-purchase opportunities for other viewers. For example, interactivity may be provided, such as with a set-top box or other device connected to (e.g., plugged into) the network, such that a viewer consumer can "tag" a product in an existing program, such as a re-run of a television show or a movie being broadcast on a cable network. In such an example, if a viewer is watching Sex and the City and notices a product which is "of interest", the viewer can personally electronically tag the product with product information and even provide point-of purchase capabilities. In such an example embodiment, if the "tagged" product is later purchased by other viewers, the network (e.g., cable or satellite provided) or the product seller (or affiliated agent) may reward the viewer consumer which tagged the product with a percentage of revenue generated (or with other non-monetary awards). If a monetary award is provided, the award may be paid via conventional payment or it may be applied to the viewer consumer's account, or it may be reflected in the form of a future credit or discount. In certain of these embodiments, it may be desirable for viewer consumers to be linked, within the network, only to other viewer consumers which the viewer consumer selects (thus viewer consumers can share cable or other network content or tags displayed on their televisions, or individually created or authored with a specially provisioned set-top or computer or similar device, with their friends). These capabilities can also be applied to still photos, such as photos displayed in social networking sites, or to videos displayed in social networking sites or video sharing sites. For example, if a user of a social networking site posts a photo or views a photograph on the website which contains a product which is familiar to the user (or otherwise of interest to the user), the user can electronically tag the product with product information and/or a point-of purchase link or opportunity. For example, rather than tagging a photograph with the name of the person shown in the photograph, the user can electronically tag the sunglasses (or outfit or purse) the person is wearing. Existence of the tag may be revealed by the hovering of a conventional cursor over the product (e.g., in the case of a social network site being accessed by computer), or by the presence of a herein described "halo", or by any other method. By clicking on the tag created by the user, information and/or a point-of purchase opportunity can be provided such as in the form illustrated in FIG. 5 (or in any other form or method). Of course, the precise content or form of content which may be provided is not limited by the description herein. Again, in this scenario, if another user (or viewer consumer) views and ultimately utilizes the product tag (such as to buy the product or to subscribe to notifications or coupons), the original user that created the product tag may be rewarded (such as by the social networking site, the product seller, the network, or a third party agent). Rewards may be monetary or non-monetary in nature.

Although many of the embodiments contemplated herein employ product placement related data streams and/or content which is created at the time of the television show or movie (or other media type) creation, in other embodiments the data streams and/or content may be created post-production. For example, product placement related data streams and/or content may be created even years after an original movie or television production and then delivered over a bi-directional network in conjunction with such media program. This may be accomplished, such as in one example embodiment, in which the time sequence of product (or service) appearances in a movie or television show are measured or notated and/or recorded in a database. Once stored in a database as such, viewer queries (e.g., remote control button pushes) can be time measured or time sequenced (e.g., relative to the linear length of the movie or television stream) and then "time stamps" of the viewer query compared against the database containing data pertaining to product placements. When a match is determined, downstream data can be delivered and made overt or visible so that the viewer is provided with an opportunity to purchase the product, subscribe to the product, or view or obtain additional information, etc. In such an embodiment, for example, the product placement (or advertisement) related data streams can be created by a third party which is not affiliated with a cable or satellite network or affiliated with a movie or television company (though such involvement is not precluded). In such an example embodiment, a receiver/transceiver may be provisioned with unique hardware and/or software (e.g., capable of performing one or more of the processes and/or methods described herein) and then connected to the cable or satellite network. This may be accomplished, for example, by simply plugging such a receiver/transceiver into the network with coaxial cable, fiber optic lines, or via wireless signals, for example.

In still further embodiments, point of purchase opportunities can be provided on one of the herein described bi-directional networks for conventional television ads. With a conventional television commercial, for example, it is not currently possible to directly purchase the goods being displayed in the commercial. In at least one embodiment of the invention, however, if a viewer viewing a commercial finds an advertised product desirable, the viewer may—similar to the other embodiment described above—initiate an information query or complete a purchase by using a set-top box remote control, for example. If a pizza commercial is played during a television show break, for example, a viewer can press a purchase button on a cable box remote control, select the pizza desired (e.g., size, toppings, etc.) and complete the purchase without ever leaving the view of the television. This, of course, applies to an infinite number of other products and services as well (just as it does with respect to the other invention embodiments described herein). In certain preferred embodiments, the viewer can complete the purchase with the remote control and then the pizza (or other product) will be charged to an account pre-stored either in the cable or set-top box or in a database within or connected to the cable (or satellite) network. In still other embodiments, for example, upon initiating of a "query" during a television commercial, the bi-directional data may be rerouted to an internet based data-stream or database (just as with other embodiments, for example). In such an instance, the signal or instruction to re-route to a particular url or internet or world-wide-web location, for example, may be embedded in the data stream comprising the television commercial or may be present in separate data stream. In still other embodiments, upon detection of a viewer "query" a database may be accessed to determine instructions for subsequent data delivery (upstream and/or downstream) similar to the other embodiments described herein above.

In still additional alternative embodiments, a mobile device, such as a mobile phone, may be provisioned to interact with the television or movie network. In still other embodiments, a mobile device, such as a mobile phone, may be provisioned to interact with a receiver/transceiver co-located in a public movie theatre which is capable of and/or delivering product placement related data streams which correspond to displayed movie content.

In other embodiments, such as in embodiments in which third parties are creating and/or inserting product placement type data streams (but not limited to such embodiments), facial recognition software can be re-provisioned or re-configured or designed to recognize products displayed in movie or television content for the purposes of matching such product recognitions with product advertisements or point of purchase opportunities.

While each of the above-described components (or steps) are excellent for their intended purposes, they are not each required to be utilized or employed as exactly described or otherwise depicted and certain/each component(s) (or steps) may be reconfigured or replaced or repositioned without departing from the scope of the invention.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined:

I claim:
1. A method comprising:
   storing in an address database consumer viewer delivery address information;
   storing in a payment database consumer viewer payment account information;
   transmitting data comprising a program feed from a program feed source in a bi-directional data network to a display screen displaying said program feed to a consumer viewer, the program feed including movie or television or social media content;
   transmitting data comprising covert or invisible advertising data, not initially visibly displayed on the display screen to the consumer viewer, from a source in said bi-directional network to said display screen displaying said movie or television or social media content feed or to a hardware device communicably connected to said display screen;
   the consumer viewer, viewing said display screen, activating a query comprising a data request upon viewing a desired product displayed in said movie or television or social media content feed;
   processing said data request, including by querying a database connected to said bi-directional data network, for available data, to determine whether product information is available for particular products displayed on said display screen at the particular time during which said data request is initiated by said consumer viewer activated query;
   displaying available product information for the particular products displayed on said display screen at the particular time during which said data request is initiated by said consumer viewer activated query;
   providing a point of purchase opportunity for the consumer viewer to purchase the products for which available product information is displayed on said display screen;
   accessing said address and payment databases upon consumer viewer acceptance of said point of purchase opportunity to purchase one or more products, and debiting or charging said stored consumer viewer payment account for a price or prices of the one or more products purchased and initiating delivery of the one or more products purchased to said stored consumer viewer delivery address; and wherein said covert or invisible advertising data originates from a consumer viewer that electronically tags a photograph or video displayed in said program feed, said electronic tai added by the originating consumer viewer becoming a point of purchase opportunity, for a product associated with said electronic tag, for other consumer viewers other than the consumer viewer that originated said electronic tag; and wherein when a different consumer viewer utilizes said electronic tag to complete a product purchase, the consumer viewer which originated said electronic tag is monetarily compensated.

2. The method according to claim 1, wherein the bi-directional network comprises a cable plant including a network of coaxial cable, a head end, and a plurality of viewer network terminations or terminals.

3. The method according to claim 1, wherein the bi-directional network comprises a cable plant comprising a network of coaxial cable communicably connected with fiber optic transmission lines.

4. The method according to claim 1, wherein the network includes, comprises, or uses a wireless or satellite network.

5. The method according to claim 1, where a viewer may, when a desirable product or service is displayed in a movie or television or social media video program feed, call upon said bi-directional network to provide, by accessing a database:
product information, actor or actress information, size, price, retail store availability, future or current sale information, information regarding other products within the same brand, competing brand products, a product purchase opportunity, a subscribe-to-product opportunity, or coupon opportunities.

6. The method according to claim 1 wherein revenue from products purchased by a consumer viewer is apportioned among the network, a product manufacturer or seller, an advertiser, a movie producer, and/or a television producer.

7. The method according to claim 1 whereupon when a consumer viewer activates a query comprising a data request, one or more visual cues are displayed on said display screen to indicate products and/or services for which information, advertising, product purchase or subscribe-to opportunities are available.

8. The method according to claim 7 wherein said one or more visual cues comprise highlight(s), shading, halo(s), text, audible indicators.

9. The method according to claim 1 whereupon when a consumer viewer activates a query comprising a data request, a time stamp is recorded or a time sequence is measured, and the time stamp or time sequence is compared to a database to ascertain matching products or services for delivery of downstream data pertinent to the viewer product or service interest.

10. The method according to claim 1 wherein product placements and/or advertisements and/or point of purchase opportunities and/or information is provided, upon request or query of a viewer, for products or services audibly discussed, but not visually displayed in a movie or television program or video display.

11. The method according to claim 1 wherein a plurality of merchant accounts or micro-networks are communicably connected to said bi-directional network.

12. The method according to claim 1 wherein product placement advertising fees are determined according to number of counted viewer queries and/or information requests and/or purchases.

13. The method according to claim 1 further wherein provisioned product recognition software is utilized to recognize products displayed for the purposes of matching recognized products with product advertisements or point of purchase opportunities.

14. The method according to claim 1 further wherein said electronic tag may be utilized to subscribe to sale information pertaining to price discounts for the product which has become associated with said electronic tag, said on-sale information delivered by SMS, MMS, or electronic mail.

15. A method of delivering advertising or point of purchase opportunities which are initially covert or invisible but which are capable of conversion by viewers, upon specific action or request made by viewers, to be overt or visible, comprising:
storing in an address database consumer viewer delivery address information;
storing in a payment database consumer viewer payment account information;
transmitting data comprising a social media program feed from a program feed source in a bi-directional data network to a display screen displaying said social media program feed to a consumer viewer, the social media program feed including photograph or video content;
the consumer viewer, viewing said display screen, activating a query comprising a data request upon viewing a desired product displayed in said photograph or video content;
processing said data request, including by querying a database connected to said bi-directional data network, for available data, to determine whether product information is available for particular products displayed on said display screen at the particular time during which said data request is initiated by said consumer viewer, a presence of available data in said database initiating a conversion of a covert, non-program-interruptive product placement advertisement, not initially interruptively displayed on said display screen, to a visible advertisement comprising a display of available product information for the particular products displayed on said display screen at the particular time during which said data request is initiated by said consumer viewer activated query;
providing a point of purchase opportunity for the consumer viewer to purchase the products for which available product advertising information is displayed on said display screen; and
accessing said address and payment databases upon consumer viewer acceptance of said point of purchase opportunity to purchase one or more products, and debiting or charging said stored consumer viewer payment account for a price or prices of the one or more products purchased and initiating delivery of the one or more products purchased to said stored consumer viewer delivery address; and
wherein said covert or invisible advertising data originates from a consumer viewer that electronically tags a photograph or video, uploaded into said social media program feed by such tagging consumer viewer, such that said uploaded photograph or video is thereafter displayed in said social media program feed for viewing by other consumer viewers, said electronic tag added by the tagging consumer viewer being associated with a product visible in said uploaded photograph or video and becoming a point of purchase opportunity for other consumer viewers other than the consumer viewer that originated said electronic tag; and
wherein after a different consumer viewer utilizes said electronic tag to complete a purchase of said visible product which has become associated with said electronic tag, the consumer viewer which originated said electronic tag is monetarily compensated.

16. The method according to claim 15 further wherein provisioned product recognition software is utilized to recognize products displayed for the purposes of matching recognized products with point of purchase opportunities.

17. The method according to claim 15 further wherein said electronic tag may be utilized to subscribe to sale information pertaining to price discounts for the product which has become associated with said electronic tag, said on-sale information delivered by SMS, MMS, or electronic mail.

* * * * *